(12) United States Patent
Hirai

(10) Patent No.: US 9,272,216 B2
(45) Date of Patent: Mar. 1, 2016

(54) IDENTIFICATION APPARATUS

(71) Applicant: Hidekuni Hirai, Urayasu (JP)

(72) Inventor: Hidekuni Hirai, Urayasu (JP)

( * ) Notice: Subject to any disclaimer, the term of this patent is extended or adjusted under 35 U.S.C. 154(b) by 0 days.

(21) Appl. No.: 14/190,462

(22) Filed: Feb. 26, 2014

(65) Prior Publication Data

US 2015/0148121 A1 May 28, 2015

(30) Foreign Application Priority Data

Nov. 28, 2013 (JP) .................. 2013-245673

(51) Int. Cl.
| | | |
|---|---|---|
| *A63F 13/235* | (2014.01) | |
| *A63F 13/69* | (2014.01) | |
| *A63F 13/77* | (2014.01) | |
| *G06F 3/041* | (2006.01) | |

(52) U.S. Cl.
CPC ............... *A63F 13/235* (2014.09); *A63F 13/69* (2014.09); *A63F 13/77* (2014.09); *G06F 3/041* (2013.01)

(58) Field of Classification Search
USPC .......................................... 463/29, 30, 31, 32
See application file for complete search history.

(56) References Cited

U.S. PATENT DOCUMENTS

| | | | | |
|---|---|---|---|---|
| 2012/0007817 | A1* | 1/2012 | Heatherly et al. | 345/173 |
| 2012/0295684 | A1* | 11/2012 | Richter et al. | 463/16 |
| 2013/0277915 | A1* | 10/2013 | Garrett | 273/293 |

FOREIGN PATENT DOCUMENTS

| | | |
|---|---|---|
| CN | 201408432 Y | 2/2010 |
| CN | 102371070 A | 3/2012 |
| EP | 2 458 526 A1 | 5/2012 |
| JP | A-2013-581 | 1/2013 |
| JP | A-2013-121533 | 6/2013 |

OTHER PUBLICATIONS

Japanese Office Action issued in Japanese Patent Application No. 2013-245673 on Jul. 22, 2014 (with translation).
Sep. 25, 2015 Office Action issued Chinese Patent Application No. 201410709906.0.

* cited by examiner

*Primary Examiner* — Paul A D'Agostino
*Assistant Examiner* — Brandon Gray
(74) *Attorney, Agent, or Firm* — Oliff PLC

(57) ABSTRACT

An apparatus body is provided with a sensor face in which a plurality of sensor electrodes for detecting electrostatic capacitance are disposed. A recognition pattern formed by connecting a plurality of conductive spots through conductive lines is provided in an identification body. When the recognition pattern of the identification body is made to face the sensor face of the apparatus body, the plurality of sensor electrodes are electrically connected to one another through the recognition pattern to thereby generate a change of electrostatic capacitance so that the apparatus body can identify the recognition pattern based on the change of electrostatic capacitance. Thus, it is possible to provide an identification apparatus which can be manufactured inexpensively without use of an expensive apparatus such as an RFID system.

8 Claims, 10 Drawing Sheets

IDENTIFICATION APPARATUS

BACKGROUND OF THE INVENTION

1. Field of the Invention

This invention relates to an identification apparatus which can identify an ID of an identification body such as a top or a card.

2. Description of the Background Art

In the background art, there has been known a toy in which an ID is given to an identification body such as a top or a card so that an identification apparatus can identify the ID so as to execute a predetermined action.

For example, in JP-A-2013-000581, there has been described a configuration in which corresponding pieces of identification information are given to toy bodies such as trading cards, figures and plastic models so that a game apparatus can read each piece of identification information so as to output a predetermined sound or display. Incidentally, in JP-A-2013-000581, there has been description that bar codes or RFIDs are used as the identification information to be read.

As described above, bar codes or RFIDs are typically used in the background-art identification apparatus.

However, the bar codes have a fault in weakness to water or abrasion. In addition, there is another problem that the outer appearance may be affected by a region which must be allocated for printing the bar codes.

In this respect, the problem caused by the bar codes cannot occur if the RFIDs are used. However, since the apparatus using the RFIDs is expensive, a more inexpensive identification apparatus is required in the fields of toys etc. having lots of restrictions on manufacturing cost.

SUMMARY OF THE INVENTION

Therefore, an object of the invention is to provide an identification apparatus which can be manufactured inexpensively without using an expensive apparatus such as an RFID system.

In order to solve the aforementioned problems, the invention is characterized as follows.

(First Configuration)

The identification apparatus according to a first configuration of the invention is an identification apparatus including: an identification body such as a top or a card; and an apparatus body for identifying an ID of the identification body; wherein: the apparatus body has a sensor face in which a plurality of sensor electrodes for detecting a change of electrostatic capacitance are disposed; a recognition pattern formed by connecting a plurality of conductive spots through conductive lines is provided in the identification body; and the recognition pattern of the identification body is made to face the sensor face of the apparatus body so that the plurality of sensor electrodes can be electrically connected to one another through the recognition pattern to thereby generate a change of electrostatic capacitance, based on which the apparatus body can identify the recognition pattern.

(Second Configuration)

In addition to the aforementioned feature of the first configuration of the invention, a second configuration of the invention is characterized as follows.

That is, the conductive spots are connected through the conductive lines so that two or three conductive spots can be connected to each other through each conductive line.

(Third Configuration)

In addition to the aforementioned feature of the first configuration of the invention, a third configuration of the invention is characterized as follows.

That is, when the recognition pattern of the same identification body is rotated to face the sensor face of the apparatus body, a different identification result can be obtained.

(Fourth Configuration)

In addition to the aforementioned feature of the first configuration of the invention, a fourth configuration of the invention is characterized as follows.

That is, when the recognition pattern of the same identification body is reversed to face the sensor face of the apparatus body, a different identification result can be obtained.

(Fifth Configuration)

An identification apparatus according to a fifth configuration of the invention is an identification apparatus for identifying an ID of an identification body such as a top or a card, including: a sensor face where a plurality of sensor electrodes for detecting a change of electrostatic capacitance are disposed; and a control unit for identifying the ID of the identification body based on the change of electrostatic capacitance in the sensor electrodes; wherein: the control unit identifies the ID of the identification body based on a combination of the sensor electrodes from which a predetermined change of electrostatic capacitance has been detected.

According to the first configuration of the invention as described above, the apparatus body is provided with the sensor face in which the plurality of sensor electrodes for detecting electrostatic capacitance are disposed. A recognition pattern which is formed by connecting a plurality of conductive spots through conductive lines is provided in an identification body. When the recognition pattern of the identification body is made to face the sensor face of the apparatus body, the plurality of sensor electrodes are electrically connected to one another through the recognition pattern to thereby generate a change of electrostatic capacitance so that the apparatus body can identify the recognition pattern based on the change of electrostatic capacitance. That is, the plurality of sensor electrodes are connected through the recognition pattern of the identification body so that an electric current can flow from one sensor electrode into another sensor electrode to thereby generate a change of electrostatic capacitance. The apparatus body detects the sensor electrodes where the change of electrostatic capacitance has occurred in this manner, and identifies the recognition pattern based on the combination of the detected sensor electrodes.

According to such a configuration, the identification apparatus can be manufactured inexpensively using background art type electrostatic capacitance sensors even if RFIDs are not used. In addition, by use of the electrostatic capacitance sensors, the front surface of the recognition pattern of the identification body can be covered with an insulator (paper, synthetic resin, etc.) so that an ID can be given to the identification body without affecting the outer appearance of the identification body.

In addition, according to the second configuration of the invention as described above, the conductive spots are connected through the conductive lines so that two or three conductive spots can be connected by each conductive line. The number of conductive spots may be set desirably in accordance with the recognition pattern. Since it is necessary to change electrostatic capacitance in the sensor electrodes, the minimum number of conductive spots is 2 and the maximum number of conductive spots is equal to the total number of sensor electrodes. In the invention, the recognition pattern is formed as combinations each consisting of two or three conductive spots connected through one conductive line regardless of the number of conductive spots as long as it is at least 2. In other words, there is no combination consisting of four or more conductive spots connected through one conductive line. Since the pattern of connecting conductive spots using conductive lines can be made simple in this manner, mass production can be made easy.

In addition, according to the third configuration of the invention as described above, a different identification result can be obtained when the recognition pattern of the same identification body is rotated to face the sensor face of the apparatus body. Accordingly, different actions can be performed by one and the same identification body so that the variation of the toy etc. can be made rich.

In addition, according to the fourth configuration of the invention as described above, a different identification result can be obtained when the recognition pattern of the same identification body is reversed to face the sensor face of the apparatus body. Accordingly, different actions can be performed by one and the same identification body so that the variation of the toy etc. can be made rich.

In addition, as described above, the identification apparatus according to the fifth configuration of the invention is provided with the sensor face in which the sensor electrodes for detecting electrostatic capacitance are disposed, and the control unit which identifies an ID of an identification body based on a change of electrostatic capacitance in the sensor electrodes. The control unit identifies the ID of the identification body based on a combination of the sensor electrodes from which a predetermined change of electrostatic capacitance has been detected. That is, when the sensor electrodes are connected, a change of electrostatic capacitance occurs due to an electric current flowing from one electrode to another electrode. The sensor electrodes in which the change of electrostatic capacitance has occurred in this manner are detected so that the recognition pattern can be identified based on the combination of the detected sensor electrodes. According to such a configuration, it is possible to manufacture an identification apparatus inexpensively using background art type electrostatic capacitance sensors even if RFIDs are not used.

DETAILED DESCRIPTION OF THE INVENTION

An embodiment of the invention will be described with reference to the drawings.

Figure 1:
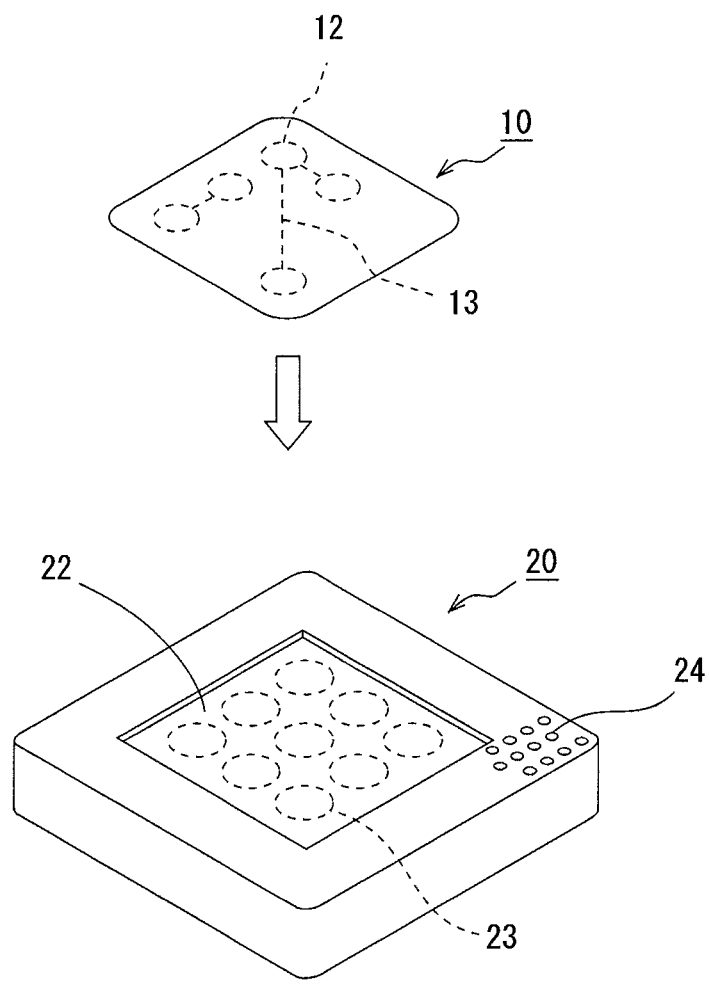
FIG. 1 is a view of the external appearance of an identification apparatus.

As shown in FIG. 1, an identification apparatus according to the embodiment is provided with an identification body 10 such as a top or a card, and an apparatus body 20 for identifying an ID of the identification body 10.

A recognition pattern formed by connecting a plurality of conductive spots 12 through conductive lines 13 is embedded in the identification body 10. The recognition pattern can be used as an ID of the identification body 10. The pattern set in one identification body 10 differs from the pattern set in another identification body 10. Both the conductive spots 12 and the conductive lines 13 constituting the recognition pattern are made of a conductive material and disposed correspondingly to positions of sensor electrodes 23 which will be described later so that the sensor electrodes 23 can be electrically connected through the conductive spots 12 and the conductive lines 13.

Incidentally, the identification body 10 used in the embodiment is shaped like a card. For example, the card-like identification body 10 may be formed so that a recognition pattern is held between two surface members. According to a method for manufacturing the card-like identification body 10, for example, a recognition pattern may be printed in conductive ink etc. on the back side of one surface member while the other surface member is then pasted thereon.

According to another method for manufacturing the card-like identification body 10, a recognition pattern may be formed in one surface member, on which the other surface member is then pasted. In this method, for example, the recognition pattern has a configuration in which conductive lines 13 are disposed on the back side of the one surface member and conductive thin pieces (metal pieces of aluminum foil etc.) which have been punched are attached onto the conductive lines 13 so as to form conductive spots 12.

Each of the surface members may be made of an insulator such as paper or synthetic resin. A desired pattern etc. may be disposed in the front surface of each of the surface members so that the recognition pattern inside the surface members cannot be visually recognized from the outside.

As shown in FIG. 1, the apparatus body 20 is provided with a sensor face 22 for mounting the identification body 10 thereon. A plurality of sensor electrodes 23 for detecting a change of electrostatic capacitance are disposed on the back side of the sensor face 22. The front surface of the sensor face 22 is made of a plate-like insulator of paper, synthetic resin, glass, etc. The sensor electrodes 23 are covered with the front surface of the sensor face 22 so that the sensor electrodes 23 cannot be touched directly.

Figure 2:
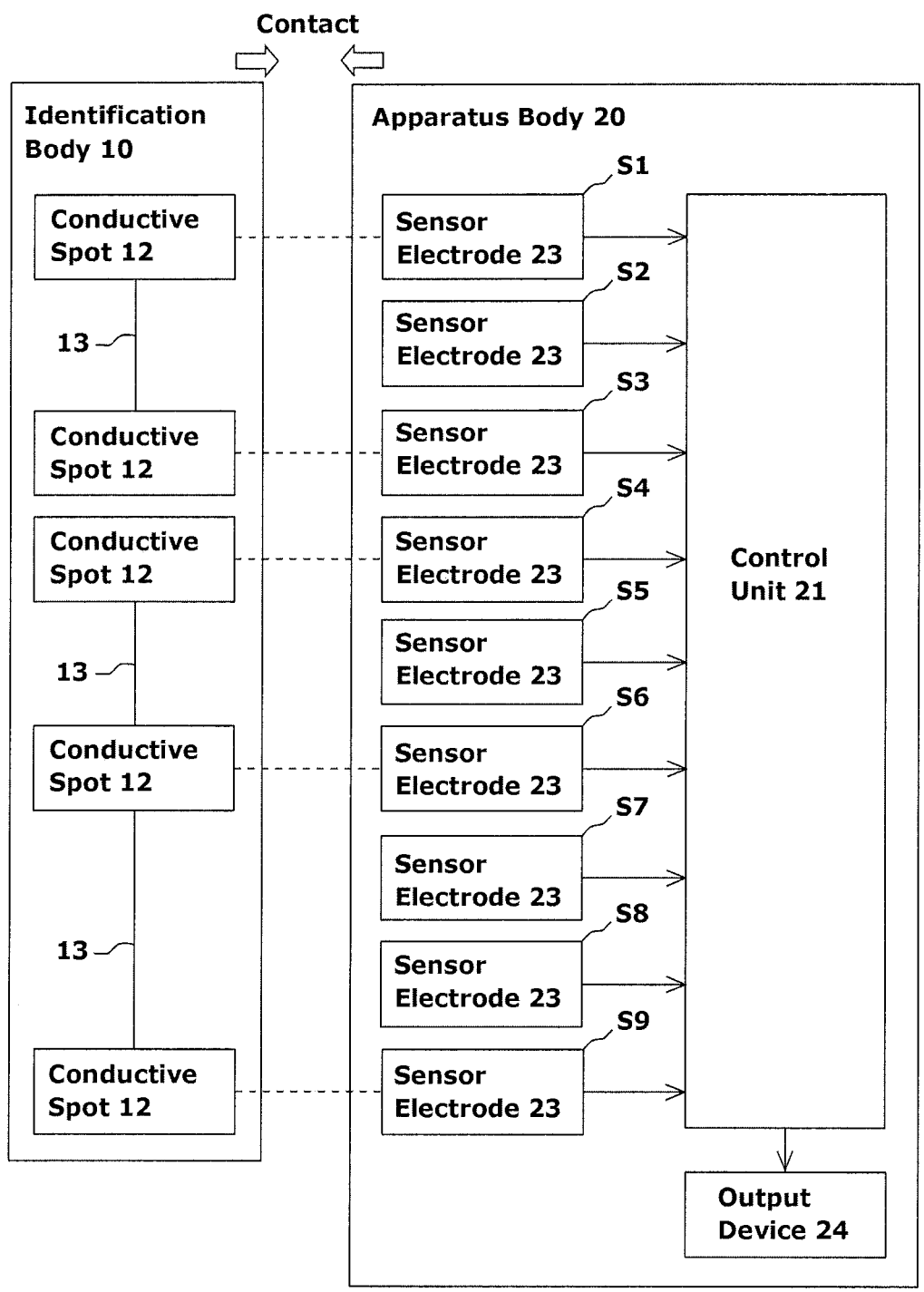
FIG. 2 is a block diagram showing the internal structure of the identification apparatus.

In addition, as shown in FIG. 2, a control unit 21 for controlling the operation of the apparatus body 20 and an output device 24 for performing a predetermined action based on a signal from the control unit 21 are built in the apparatus body 20.

For example, the control unit 21 is a device which is mainly constituted by a CPU and provided with an ROM, an RAM, etc. The CPU reading a program stored in the ROM executes various kinds of control. Specifically, the control unit 21 according to the embodiment monitors a change of electrostatic capacitance in the aforementioned sensor electrodes 23 to specify some of the sensor electrodes 23 in which a predetermined change of electrostatic capacitance has occurred. The control unit 21 identifies a recognition pattern (that is, an ID) of the identification body 10 based on a combination of the sensor electrodes 23 from which the predetermined change of electrostatic capacitance has been detected.

The output device 24 is an audio output device such as a speaker. Incidentally, the output device 24 is not limited to the audio output device but may be a visual display device such as an LED or a liquid crystal display. The output device 24 executes a predetermined output action in accordance with a signal from the control unit 21. When, for example, the control unit 21 recognizes the identification body 10, the output device 24 outputs sound corresponding to the identification body 10.

As shown in FIG. 1, the apparatus body 20 according to the embodiment is provided with nine sensor electrodes 23. These nine sensor electrodes 23 are provided independently of one another. For example, when a person touches a sensor electrode 23 to make the sensor electrode 23 grounded, a change of electrostatic capacitance can be detected. In the embodiment, however, the electrostatic capacitance is changed not due to the person who has touched the sensor electrode 23 as in the background art but due to the recognition pattern of the identification body 10 which is made to face the sensor face 22.

That is, the conductive spots 12 of the identification body 10 are disposed in positions corresponding to the sensor electrodes 23. The number of the conductive spots 12 is up to the number (nine) of the sensor electrodes 23. As shown in FIG. 3A to 3H, each conductive line 13 connects some (two or three) of these conductive spots 12 to thereby form a recognition pattern. When the identification body 10 is placed on the sensor face 22 so that the recognition pattern formed thus can face the sensor face 22 of the apparatus body 20, some of the sensor electrodes 23 are connected electrically through the recognition pattern. In the example shown in FIG. 2, of the nine sensor electrodes 23 referred to as S1 to S9, S1 and S3 are electrically connected, and S4, S6 and S9 are electrically connected. When some of the sensor electrodes 23 are electrically connected in this manner, an electric current flows from one sensor electrode 23 into another sensor electrode 23 connected thereto so that a change of electrostatic capacitance occurs. For example, a change of electrostatic capacitance occurs in S1 due to an electric current flowing therefrom into S3, while a change of electrostatic capacitance occurs in S3 due to an electric current flowing therefrom into S1. Upon detection of the sensor electrodes 23 in which the change of electrostatic capacitance has occurred in this manner, the control unit 21 identifies the recognition pattern based on the combination of the detected sensor electrodes 23. Incidentally, the apparatus body 20 detects not which sensor electrodes 23 are connected through the conductive lines 13 but the combination of the sensor electrodes 23 where the change of electrostatic capacitance has occurred. According to such an identification method, it is possible to generate IDs corresponding to the number of combinations in which two or more can be selected from the plurality of sensor electrodes 23.

Figure 3A:
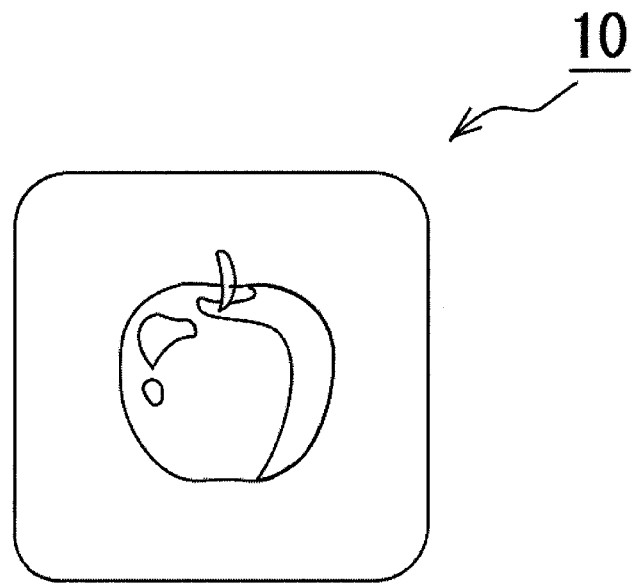
FIGS. 3A to 3H are views showing examples of identification bodies, FIG. 3A being a front view of a first identification body, FIG. 3B being a view showing a recognition pattern of the first identification body, FIG. 3C being a front view of a second identification body, FIG. 3D being a view showing a recognition pattern of the second identification body, FIG. 3E being a front view of a third identification body, FIG. 3F being a view showing a recognition pattern of the third identification body, FIG. 3G being a front view of a fourth identification body, FIG. 3H being a view showing a recognition pattern of the fourth identification body.
Figure 3B:
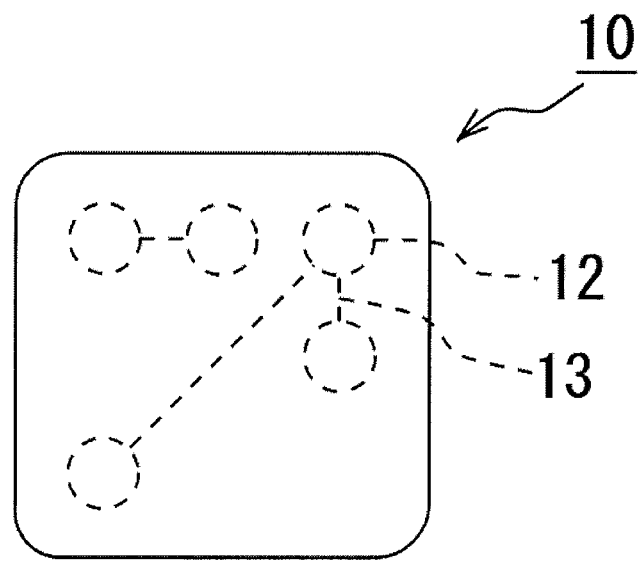
Figure 3C:
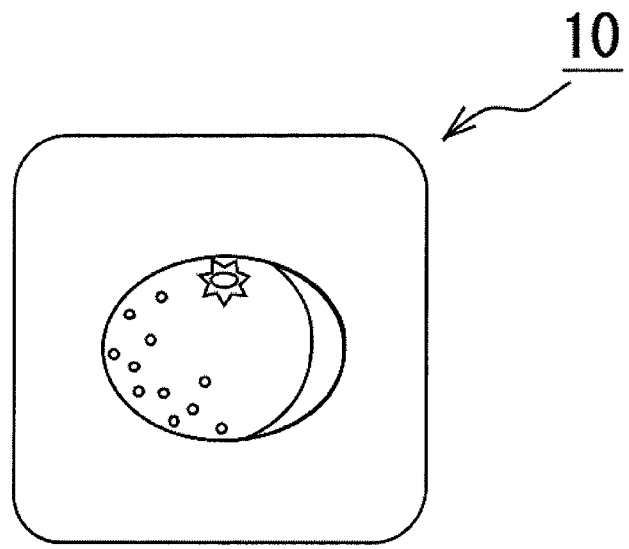

For example, the invention may be applied to an intellectual training toy, as shown in FIGS. 3A to 3H. In an application example shown in FIGS. 3A to 3H, cards with fruits drawn therein are prepared as identification bodies 10. When each of the cards is placed on the sensor face 22 of the apparatus body 20, the name of the fruit drawn in the card is pronounced from the output device 24. That is, configuration may be made as shown in FIGS. 3A to 3H so that different recognition patterns are given to the cards for displaying different kinds of fruits and sounds corresponding to the cards are outputted respectively. Specifically, configuration may be made so that when a card shown in FIG. 3A is placed on the sensor face 22, a recognition pattern shown in FIG. 3B is identified and a voice "apple" is outputted from the output device 24.

Figure 3D:
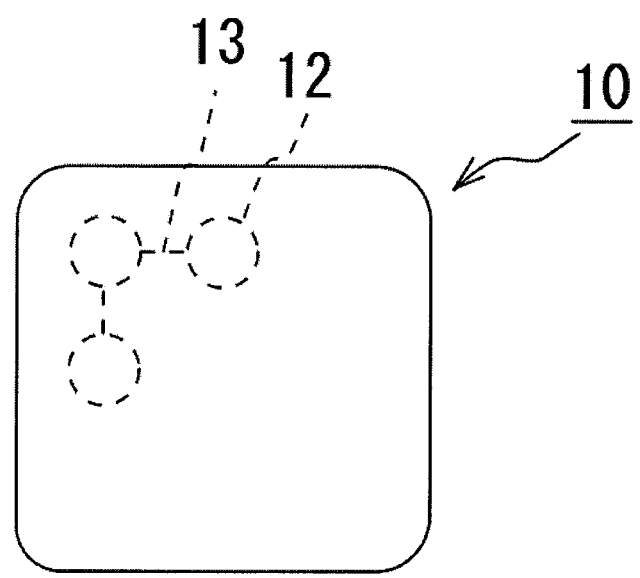
Figure 3E:
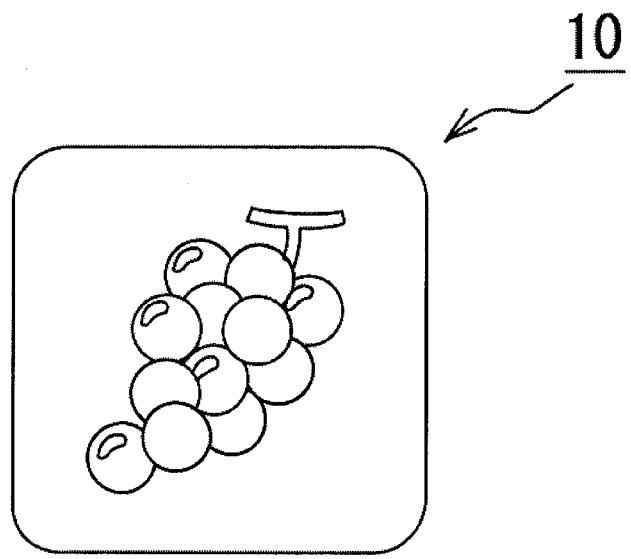
Figure 3F:
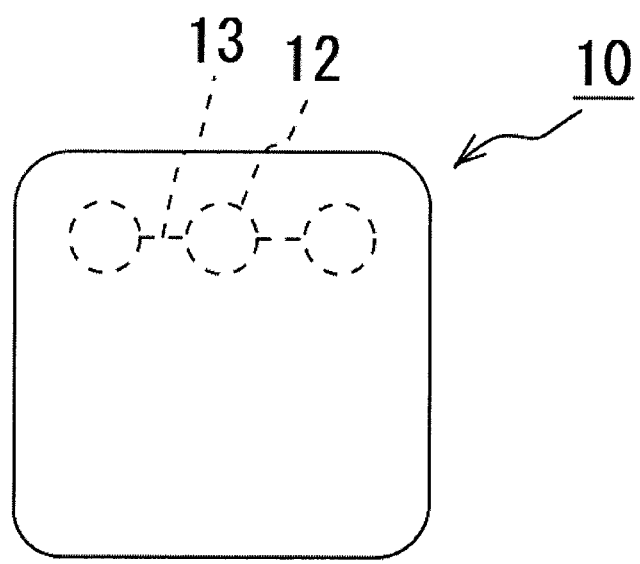
Figure 3G:
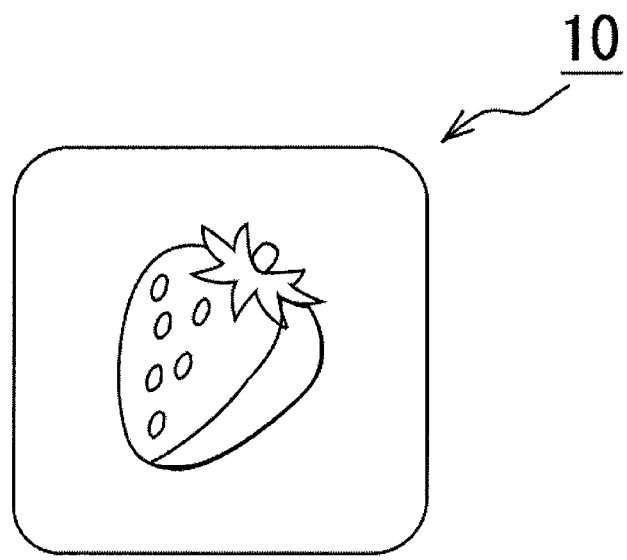
Figure 3H:
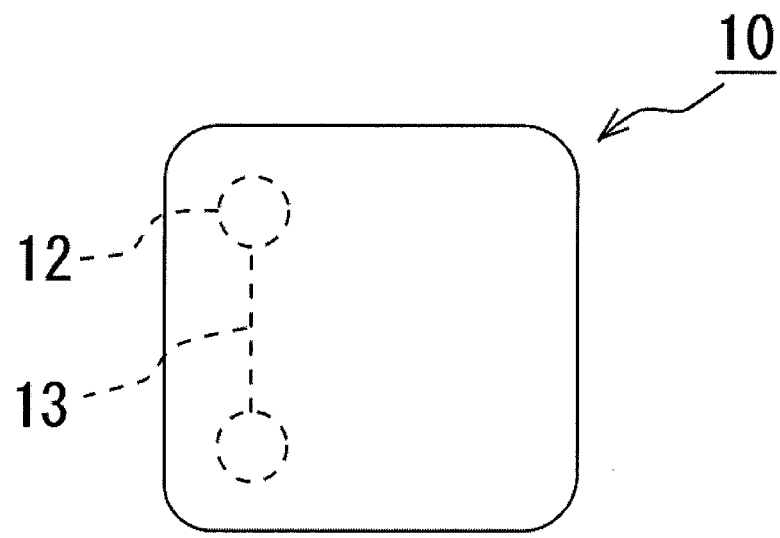

In the embodiment, each conductive line 13 is thick enough not to affect the change of electrostatic capacitance in any sensor electrode 23. Accordingly, even when one conductive line 13 is passed over a sensor electrode 23 as shown in FIG. 3B or 3D, a change of electrostatic capacitance is not detected in the sensor electrode 23 on which the conductive line 13 is passed. Thus, it is not necessary to arrange the conductive lines 13 to bypass the sensor electrodes 23, i.e. not to be passed over the sensor electrodes 23. Accordingly, the conductive lines 13 can be disposed linearly so that the identification body 10 can be manufactured easily.

Next, a modification of the embodiment will be described.

Figure 4A:
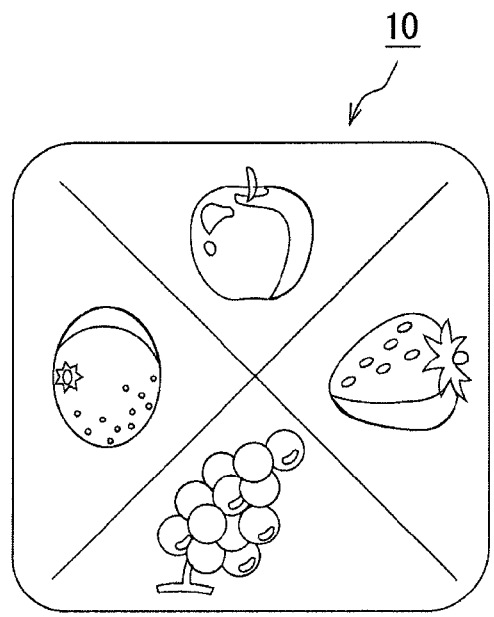
FIGS. 4A and 4B are views showing a first modification, FIG. 4A being a front view of an identification body, FIG. 4B being a view showing a recognition pattern of the identification body.
Figure 4B:
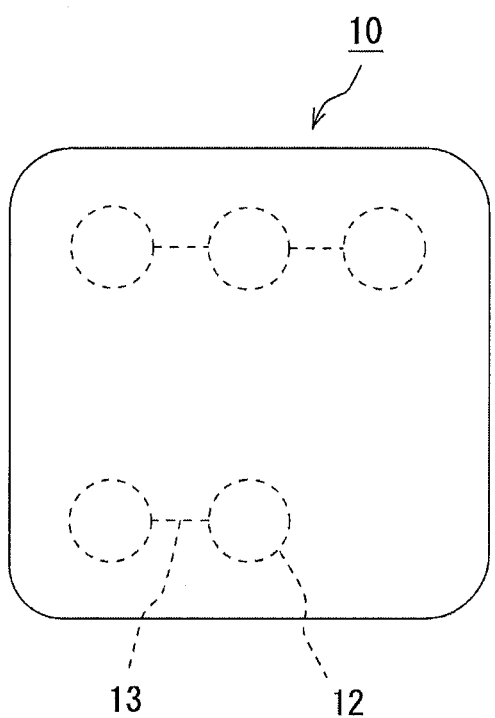
Figure 5A:
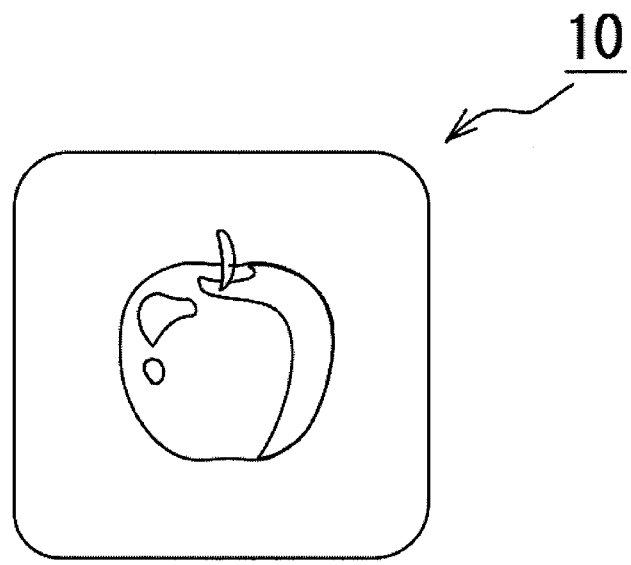
FIGS. 5A to 5D are views showing a second modification, FIG. 5A being a front view of an identification body, FIG. 5B being a view showing a recognition pattern of the identification body when the front surface of the identification body faces up, FIG. 5C being a back view of the identification body, FIG. 5D being a view showing the recognition pattern of the identification body when the back surface of the identification body faces up.
Figure 5B:
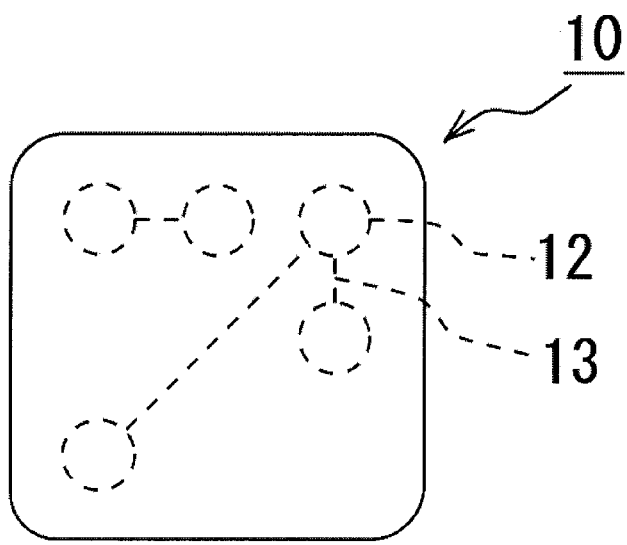
Figure 5C:
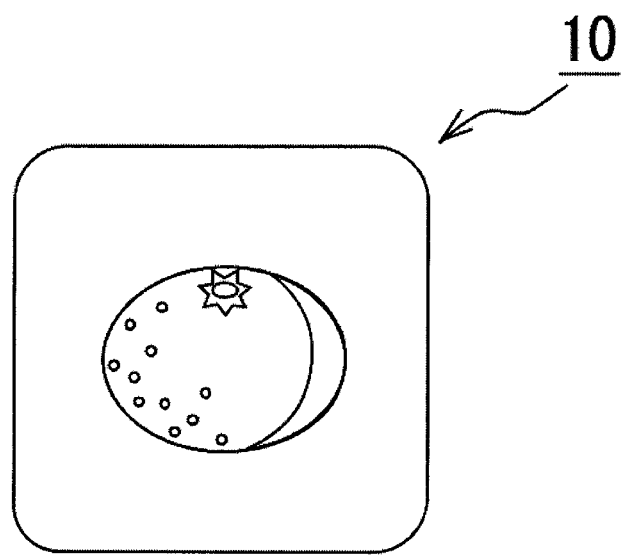
Figure 5D:
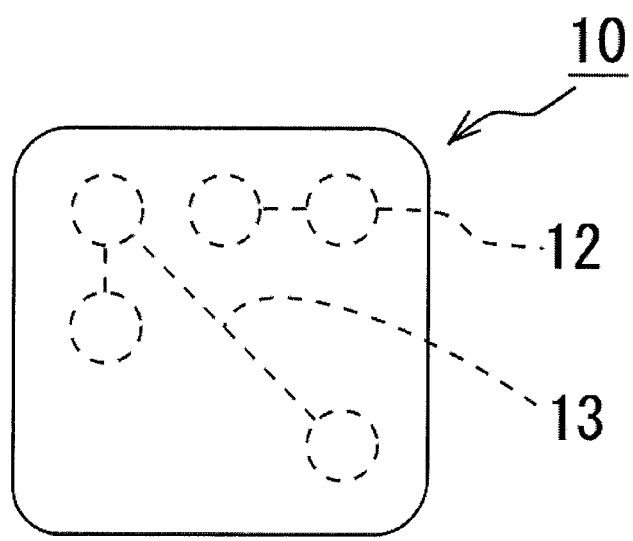

FIGS. 4A and 4B are view showing a modification of the identification body 10. According to the configuration of the modification shown in FIGS. 4A and 4B, when one and the same identification body 10 is rotated and placed on the sensor face 22, a different identification result can be obtained in the apparatus body 20. Thus, the apparatus body 20 performs different actions in accordance with respective identification results. For example, in the case of a card in which a drawing of fruits is displayed in the front surface, as shown in FIGS. 4A and 4B, different voices may be outputted in accordance with respective angles at which the card is placed on the sensor face 22. Specifically, the configuration may be arranged as follows. That is, when the card is placed on the sensor face 22 so that a drawing of an apple is located in an upper part of the card, a voice "apple" is outputted. When the card is placed on the sensor face 22 so that a drawing of a mandarin is located in an upper part of the card, a voice "mandarin" is outputted. When the card is placed on the sensor face 22 so that a drawing of grapes is located in an upper part of the card, a voice "grapes" is outputted. When the card is placed on the sensor face 22 so that a drawing of a strawberry is located in an upper part of the card, a voice "strawberry" is outputted.

FIGS. 5A to 5D are views showing another modification of the identification body 10. According to the configuration of the modification shown in FIGS. 5A to 5D, when one and the same identification body 10 is reversed and placed on the sensor face 22, a different identification result can be obtained in the apparatus body 20. Thus, the apparatus body 20 performs different actions in accordance with respective identification results. For example, in the case of a card in which the drawing of a fruit displayed in the front surface is different from the drawing of a fruit displayed in the back surface as shown in FIGS. 5A to 5D, different voices can be outputted in accordance with the respective up-facing surfaces of the card placed on the sensor face 22. Specifically, the configuration may be arranged as follows. That is, when the card with the drawing of an apple facing up is placed on the sensor face 22, a voice "apple" is outputted. When the card with the drawing of a mandarin facing up is placed on the sensor face 22, a voice "mandarin" is outputted.

Although description has been made using the card-like identification body 10 in the aforementioned embodiment by way of example, the embodiment of the invention is not limited thereto. For example, a three-dimensional identification body 10 such as a doll figure may be used. In the case where such a three-dimensional identification body 10 is used, a recognition pattern may be formed in its bottom portion etc. When the recognition pattern is formed thus, for example, a top used for a board game etc. can be used as the identification body 10 and a board surface of the board game can be configured as the apparatus body 20. Thus, when the top is simply placed on the board surface of the board game, the recognition pattern of the top can be read to output a voice etc. corresponding to the top.

In addition, the apparatus body 20 may be a transformation belt toy while a medal, a key or the like is mounted on the transformation belt toy as the identification body 10. In this case, when a predetermined medal or key or the like is mounted on the transformation belt toy, a sound effect may be generated. In addition, when the medal or key or the like mounted on the transformation belt toy is rotated, another recognition pattern may be read to generate a unique sound effect.

Figure 6A:
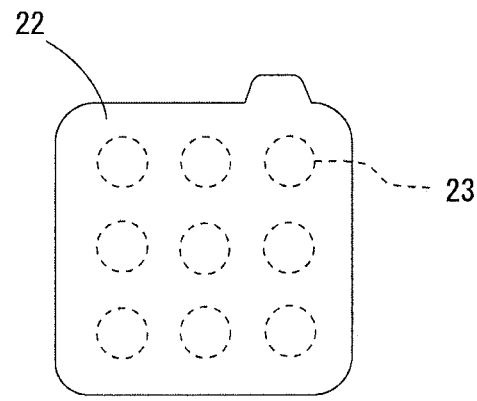
FIG. 6A is a view showing a sensor face 22 according to a third modification.
Figure 6B:
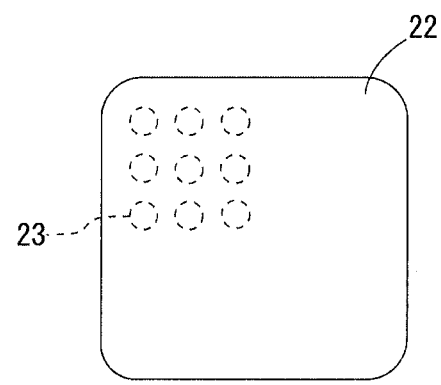
FIG. 6B is a view showing a sensor face 22 according to a fourth modification.
Figure 6C:
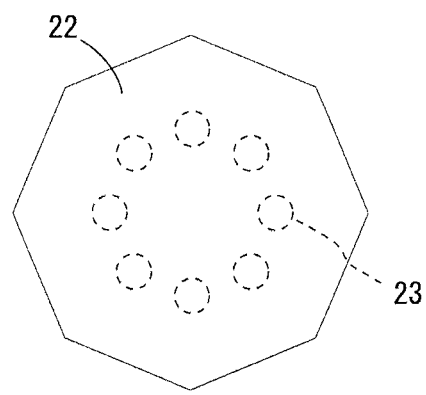
FIG. 6C is a view showing a sensor face 22 according to a fifth modification.

Incidentally, the shape of the sensor face 22 or the layout of the sensor electrodes 23 is not limited to a square shape as shown in FIG. 1, but may be arranged variously in accordance with the aim. For example, the shape of the sensor face 22 may be formed as an asymmetric shape, as shown in FIG. 6A. When a mount face of an identification body 10 is formed to be consistent with the asymmetric shape, the identification body 10 can be set only in a predetermined direction. Accordingly, the identification body 10 can be prevented from being set in a wrong direction. In addition, when the sensor electrodes 23 are arranged to lean in a predetermined direction of the sensor face 22 as shown in FIG. 6B, the recognition pattern can be prevented from being read if the identification body 10 is set in a wrong direction. Accordingly, the recognition pattern can be identified to output a correct answer sound only when, for example, the identification body 10 is set in a predetermined direction in an intellectual training toy etc. In addition, in the case where the sensor electrodes 23 are arranged to form a circular shape or an arc shape as shown in FIG. 6C, different identification results can be obtained while the identification body 10 is rotated little by little. Thus, for example, a toy in which a story can be developed by rotation of the identification body 10 may be manufactured.

As described above, according to the embodiment, the apparatus body 20 is provided with the sensor face 22 in which the plurality of sensor electrodes 23 for detecting electrostatic capacitance are disposed. A recognition pattern which is formed by connecting a plurality of conductive spots 12 through conductive lines 13 is provided in an identification body 10. When the recognition pattern of the identification body 10 is made to face the sensor face 22 of the apparatus body 20, the plurality of sensor electrodes 23 are electrically connected to one another through the recognition pattern to thereby generate a change of electrostatic capacitance so that the apparatus body 20 can identify the recognition pattern based on the change of electrostatic capacitance. That is, the plurality of sensor electrodes 23 are connected through the recognition pattern of the identification body 10 so that an electric current flows from one sensor electrode 23 into another sensor electrode 23 to thereby generate a change of electrostatic capacitance. The apparatus body 20 detects the sensor electrodes 23 where the change of electrostatic capacitance has occurred in this manner, and identifies the recognition pattern based on the combination of the detected sensor electrodes 23.

According to such a configuration, the identification apparatus can be manufactured inexpensively using background art type electrostatic capacitance sensors even if RFIDs are not used. In addition, by use of the electrostatic capacitance sensors, the front surface of the recognition pattern of the identification body 10 can be covered with an insulator (paper, synthetic resin, etc.) so that an ID can be given to the identification body 10 without affecting the outer appearance of the identification body 10.

In addition, the conductive spots 12 are connected through the conductive lines 13 so that two or three conductive spots 12 can be connected through each conductive line 13. The number of conductive spots 12 may be set desirably in accordance with the recognition pattern. Since it is necessary to change electrostatic capacitance in the sensor electrodes 23, the minimum number of conductive spots 12 is 2 and the maximum number of conductive spots 12 is equal to the total number of sensor electrodes 23. In the embodiment, the recognition pattern is formed as combinations each consisting of two or three conductive spots connected through one conductive line regardless of the number of conductive spots as long as it is at least 2. In other words, there is no combination consisting of four or more conductive spots connected through one conductive line. Since the pattern of connecting conductive spots 12 using the conductive lines 13 can be made simple in this manner, mass production can be made easy.

In addition, the configuration may be arranged so that a different identification result can be obtained when the same identification body 10 is rotated to face the sensor face 22 of the apparatus body 20, as shown in FIGS. 4A and 4B. In this configuration, different actions can be performed by one and the same identification body 10 so that the variation of the toy etc. can be made rich.

In addition, the configuration may be arranged so that a different identification result can be obtained when the same identification body 10 is reversed to face the sensor face 22 of the apparatus body 20, as shown in FIGS. 5A to 5D. In this configuration, different actions can be performed by one and the same identification body 10 so that the variation of the toy etc. can be made rich.

What is claimed is:

1. An identification apparatus comprising:
   an identification body such as a top or a card; and
   an apparatus body for identifying an ID of the identification body; wherein:
   the apparatus body has a sensor face in which a plurality of sensor electrodes for detecting a change of electrostatic capacitance are disposed;
   a recognition pattern formed by connecting a plurality of conductive spots through conductive lines is provided in the identification body;
   the conductive spots are allocated in a one-to-one correspondence with the sensor electrodes; and
   the recognition pattern of the identification body is made to face the sensor face of the apparatus body so that the plurality of sensor electrodes can be electrically connected to one another through the recognition pattern to thereby generate a change of electrostatic capacitance that is produced through only contact between the identification body and the apparatus body such that the apparatus body identifies the recognition pattern based on the change of electrostatic capacitance.

2. The identification apparatus according to claim 1, wherein:
   the conductive spots are connected through the conductive lines so that two or three conductive spots can be connected to each other through each conductive line.

3. The identification apparatus according to claim 1, wherein:
when the recognition pattern of the same identification body is rotated to face the sensor face of the apparatus body, a different identification result can be obtained.

4. The identification apparatus according to claim 1, wherein:
when the recognition pattern of the same identification body is reversed to face the sensor face of the apparatus body, a different identification result can be obtained.

5. An identification apparatus comprising:
an identification body having a plurality of conductive spots and a plurality of conductive lines connecting one or more conductive spots to another conductive spot, the plurality of conductive spots being disposed on the identification body to form a recognition pattern; and
an apparatus body for identifying an ID of the identification body, the apparatus body including:
a sensor face having a plurality of sensor electrodes configured to detect a change of electrostatic capacitance, the plurality of sensor electrodes being disposed in a one-to-one correspondence with the plurality of conductive spots of the identification body; and
a processor programmed to:
detect the recognition pattern of the identification body based on the change of electrostatic capacitance detected by the sensor face in response to the identification body being placed on the sensor face such that the plurality of sensor electrodes of the sensor face are electrically connected to each other through the plurality of conductive spots of the identification body, the change of electrostatic capacitance being produced through only contact between the identification body and the apparatus body; and
identify the ID of the identification body based on the detected recognition pattern.

6. The identification apparatus according to claim 5, wherein:
at least two or three conductive spots are connected to each other through a conductive line.

7. The identification apparatus according to claim 5, wherein:
a different recognition pattern is identified by the apparatus body in response to rotation of the identification body on the sensor face of the apparatus body.

8. The identification apparatus according to claim 5, wherein:
a different recognition pattern is identified by the apparatus body in response to reversal of the identification body on the sensor face of the apparatus body.

* * * * *